US012297659B2

(12) United States Patent
Huang

(10) Patent No.: US 12,297,659 B2
(45) Date of Patent: *May 13, 2025

(54) LOCK CASE WITH AN ANTI-PICK FUNCTION

(71) Applicant: I-TEK METAL MFG. CO., LTD, Tainan (TW)

(72) Inventor: Tsung-Yu Huang, Tainan (TW)

(73) Assignee: I-TEK METAL MFG. CO., LTD., Tainan (TW)

( * ) Notice: Subject to any disclaimer, the term of this patent is extended or adjusted under 35 U.S.C. 154(b) by 368 days.

This patent is subject to a terminal disclaimer.

(21) Appl. No.: 17/967,181

(22) Filed: Oct. 17, 2022

(65) Prior Publication Data

US 2024/0102315 A1 Mar. 28, 2024

(30) Foreign Application Priority Data

Sep. 23, 2022 (TW) .................................. 111136131

(51) Int. Cl.
*E05B 17/20* (2006.01)
*E05B 9/02* (2006.01)

(52) U.S. Cl.
CPC ............ *E05B 17/2003* (2013.01); *E05B 9/02* (2013.01)

(58) Field of Classification Search
CPC .. E05B 17/2003; E05B 17/20; E05B 17/2007; E05B 17/2034; E05B 17/2069; E05B 9/02; E05B 63/12; E05C 17/50; E05C 1/00
USPC ........................................................... 70/109
See application file for complete search history.

(56) References Cited

U.S. PATENT DOCUMENTS 3,917,329 A * 11/1975 Fujiki ..................... E05B 55/00 70/141
4,596,411 A * 6/1986 Geringer ............. E05B 47/0046 292/165
4,848,118 A * 7/1989 Tesone .................... E05B 15/10 292/346
5,003,796 A * 4/1991 Tom ........................ E05B 59/00 70/107
6,045,169 A * 4/2000 Frolov .................. E05B 63/202 292/335
6,131,966 A * 10/2000 Hensley .................. E05B 63/18 70/DIG. 6
6,177,771 B1 1/2001 Kinzer et al.
6,634,140 B1 10/2003 Sellman
(Continued)

FOREIGN PATENT DOCUMENTS

CN 111502415 A * 8/2020 ............ E05B 15/10
EP 3550528 A1 9/2019
(Continued)

*Primary Examiner* — Kristina R Fulton
*Assistant Examiner* — James Edward Ignaczewski
(74) *Attorney, Agent, or Firm* — Ying-Ting Chen; Law Office of Michael Chen

(57) ABSTRACT

A lock case with an anti-pick function is mounted on a door. The lock case includes a latch for retaining the door in a closed position. When the door is closed, an anti-pick latch of the lock case is in a retracted position to pivot an anti-pick member of the lock case to an anti-pick position, such that the latch cannot be picked to the latching position. When the door is not closed or a connecting member of the lock case is operated to actuate the latch, the latch can move to the latching position.

6 Claims, 10 Drawing Sheets

(56) References Cited

U.S. PATENT DOCUMENTS

| | | | |
|---|---|---|---|
| 6,786,006 B2 | 9/2004 | Kowalczyk et al. | |
| 6,891,479 B1 | 5/2005 | Eccleston | |
| 7,051,403 B2 | 5/2006 | Homberg | |
| 7,061,197 B1 | 6/2006 | Mullet et al. | |
| 7,068,179 B2 | 6/2006 | Snell et al. | |
| 7,143,547 B2 | 12/2006 | Liles, Jr. | |
| 7,234,201 B2 | 6/2007 | Brown et al. | |
| 7,282,883 B2 | 10/2007 | Mullet et al. | |
| 7,296,380 B2 | 11/2007 | Backman | |
| 7,316,096 B2 | 1/2008 | Houser et al. | |
| 7,418,800 B1 | 9/2008 | Sellman | |
| 7,431,354 B2 * | 10/2008 | Raatikainen | E05B 63/20 70/277 |
| 7,484,333 B2 | 2/2009 | Houser et al. | |
| 7,555,867 B2 | 7/2009 | Liles, Jr. | |
| 7,717,155 B2 | 5/2010 | Mullet | |
| 7,774,984 B2 | 8/2010 | Hsu | |
| 7,966,771 B2 | 6/2011 | Bienek | |
| 8,109,038 B2 | 2/2012 | Houser et al. | |
| 8,169,169 B2 | 5/2012 | Hass et al. | |
| 8,248,005 B2 | 8/2012 | Romer | |
| 8,390,219 B2 | 3/2013 | Houser | |
| 8,393,054 B2 | 3/2013 | Bienek | |
| 8,407,937 B2 | 4/2013 | Houser | |
| 8,415,902 B2 | 4/2013 | Burris et al. | |
| 8,434,268 B2 | 5/2013 | Nixon | |
| 8,499,495 B2 | 8/2013 | Houser et al. | |
| 8,547,046 B2 | 10/2013 | Burris et al. | |
| 8,601,744 B2 | 12/2013 | Wildforster et al. | |
| 8,695,277 B2 | 4/2014 | Romer et al. | |
| 8,826,598 B2 | 9/2014 | Ranaudo et al. | |
| 8,875,344 B2 | 11/2014 | Salutzki et al. | |
| 8,904,710 B2 | 12/2014 | Romer et al. | |
| 8,963,683 B2 | 2/2015 | Romer | |
| 9,003,630 B2 | 4/2015 | Hufen | |
| 9,045,927 B1 | 6/2015 | Hoffberg | |
| 9,097,051 B2 | 8/2015 | Hellwig | |
| 9,115,526 B2 | 8/2015 | Houser et al. | |
| 9,121,217 B1 | 9/2015 | Hoffberg | |
| 9,163,446 B2 | 10/2015 | Houser et al. | |
| 9,181,744 B2 | 11/2015 | Salutzki et al. | |
| 9,187,942 B2 | 11/2015 | Wildforster | |
| 9,297,194 B2 | 3/2016 | Bienek et al. | |
| 9,506,284 B2 | 11/2016 | Braverman et al. | |
| 9,514,583 B2 | 12/2016 | Zasowski et al. | |
| 9,631,412 B2 | 4/2017 | Hellwig et al. | |
| 9,683,378 B2 | 6/2017 | Houser et al. | |
| 9,695,620 B2 | 7/2017 | Zasowski et al. | |
| 9,869,117 B2 | 1/2018 | Houser et al. | |
| 9,995,076 B1 | 6/2018 | Hoffberg | |
| 10,006,236 B2 | 6/2018 | Hellwig et al. | |
| 10,024,094 B2 | 7/2018 | Bell et al. | |
| 10,030,425 B2 | 7/2018 | Zasowski et al. | |
| 10,030,426 B2 | 7/2018 | Langenberg | |
| 10,077,591 B2 | 9/2018 | Hass | |
| 10,180,023 B2 | 1/2019 | Zasowski et al. | |
| 10,208,520 B2 | 2/2019 | Long et al. | |
| 10,236,801 B2 | 3/2019 | Dye et al. | |
| 10,253,540 B2 | 4/2019 | Bell et al. | |
| 10,280,670 B2 | 5/2019 | Roberts | |
| 10,280,678 B1 | 5/2019 | Rendon, Jr. et al. | |
| 10,304,272 B2 | 5/2019 | Kvinge et al. | |
| 10,344,502 B2 | 7/2019 | McKibben et al. | |
| 10,415,301 B2 | 9/2019 | Kuan | |
| 10,458,151 B1 | 10/2019 | Shen | |
| 10,472,873 B2 | 11/2019 | Ladha et al. | |
| 10,559,151 B2 | 2/2020 | Kvinge et al. | |
| 10,704,310 B1 | 7/2020 | Barbon et al. | |
| 10,704,313 B2 | 7/2020 | Houser et al. | |
| 10,724,288 B2 | 7/2020 | Baumgarte | |
| 11,214,982 B2 * | 1/2022 | Raatikainen | E05B 53/00 |
| 2003/0155778 A1 * | 8/2003 | Dorn | E05B 65/108 292/195 |
| 2005/0154612 A1 | 7/2005 | Smith et al. | |
| 2007/0256362 A1 | 11/2007 | Hansen | |
| 2013/0009785 A1 | 1/2013 | Finn et al. | |
| 2014/0255252 A1 | 9/2014 | Stratman et al. | |
| 2014/0282934 A1 | 9/2014 | Miasnik et al. | |
| 2016/0153213 A1 * | 6/2016 | Huang | E05B 55/12 292/144 |
| 2016/0348415 A1 | 12/2016 | Baumgarte | |
| 2018/0334841 A1 | 11/2018 | Langenberg et al. | |
| 2019/0043296 A1 | 2/2019 | Baumgarte et al. | |
| 2019/0145138 A1 | 5/2019 | Eickhoff | |
| 2019/0153764 A1 | 5/2019 | Baumgarte | |
| 2019/0264486 A1 | 8/2019 | Toloday et al. | |
| 2019/0319557 A1 | 10/2019 | Dye et al. | |
| 2019/0338576 A1 | 11/2019 | Wang | |
| 2019/0345738 A1 | 11/2019 | McKibben et al. | |
| 2019/0383080 A1 | 12/2019 | Barbon et al. | |
| 2020/0037142 A1 | 1/2020 | Lofton | |
| 2020/0190885 A1 | 6/2020 | Coleman | |
| 2020/0256108 A1 | 8/2020 | Shetty et al. | |
| 2021/0012598 A1 | 1/2021 | Giebat et al. | |
| 2021/0023248 A1 | 1/2021 | Townsend et al. | |
| 2021/0056791 A1 | 2/2021 | Shen | |

FOREIGN PATENT DOCUMENTS

| | | | | |
|---|---|---|---|---|
| EP | 3569800 A1 * | 11/2019 | E05B 15/10 |
| KR | 20210019168 A | 2/2021 | |
| KR | 20210033154 A | 3/2021 | |
| WO | 2021007588 A1 | 1/2021 | |
| WO | 2021050616 A1 | 3/2021 | |
| WO | WO-2023198949 A1 * | 10/2023 | E05B 17/2003 |

* cited by examiner

LOCK CASE WITH AN ANTI-PICK FUNCTION

BACKGROUND OF THE INVENTION

The present invention relates to a lock case with an anti-pick function and, more particularly, to a lock case having a latch which cannot be retracted through a gap between a door and a door frame when in a locking state.

A lock case currently available on the market can be mounted inside a door and includes a latch which is coupled with a latch hole in a door frame around the door in a closed position, preventing opening of the door. The lock case is operatively connected to inner and outer operating devices are mounted on two sides of the door. The outer operating device in a locking state is disconnected from the lock case. Thus, the door cannot be opened from the outer side of the door when the outer operating device is not unlocked, but the door can still be opened from the inside.

However, a gap exists between the door and the door frame to permit pivotal movement of the door, such that a tool in the form of a thin plate can be inserted through the gap to pick the latch. As a result, the latch can be forcibly moved out of the latch hole while the outer operating device is in the locking state not interlocking with the lock case, and this drawback should be overcome.

BRIEF SUMMARY OF THE INVENTION

To overcome the above drawback, the present invention provides a lock case comprising:

a case body;

a latch movably coupled to the lock case and movable between a latching position and an unlatching position;

an interlocking member operatively coupled with the latch and including a push wall, wherein the push wall includes an upper end and a lower end;

an anti-pick member pivotably mounted to the case body and including a first abutting portion, wherein the anti-pick member is pivotable between an anti-pick position and a non-anti-pick position;

an anti-pick latch movably coupled to the case body and operatively connected to the anti-pick member, wherein the anti-pick latch is movable between an extended position and a retracted position, wherein when the anti-pick latch is in the extended position, the first abutting portion is spaced from the push wall of the interlocking member, and the anti-pick member remains in the non-anti-pick position, and wherein when the anti-pick latch is in the retracted position, the first abutting portion abuts against the push wall, and the anti-pick member is pivotable to the anti-pick position or the non-anti-pick position; and a connecting member pivotably connected to the case body and operatively connected to the interlocking member, wherein pivotal movement of the connecting member actuates the interlocking member and the latch to move jointly between the latching position and the unlatching position, wherein when the latch is in the latching position and the anti-pick latch is in the retracted position, the anti-pick member is in the anti-pick position and the first abutting portion abuts the lower end of the push wall, wherein when the latch is in the latching position and the anti-pick latch is in the retracted position, the anti-pick member is in the non-anti-pick position and the first abutting portion abuts the upper end of the push wall, wherein with the anti-pick member in the anti-pick position and the connecting member not pivoted, the interlocking member remains unmoved when the latch is picked to move from the latching position towards the unlatching position, such that the anti-pick member remains in the anti-pick position, preventing the latch from moving from the latching position to the unlatching position.

According to the present invention, by provision of the anti-pick latch cooperating with the interlocking member and the anti-pick member, when the door is closed, the anti-pick member automatically moves to the anti-pick position. When the latch is picked (with the intention to move the latch to the unlatching position), the interlocking member remains unmoved, such that the anti-pick member remains in the anti-pick position. Thus, the latch cannot move to the unlatching position, and the door cannot be opened.

In an example, the lock case further comprises a first spring. The latch includes a rod extending therefrom. First, second, and third retaining rings are disposed on the rod. The second retaining ring is disposed between the first retaining ring and the third retaining ring. The first spring is disposed between the first retaining ring and the case body and biases the latch to the latching position. The interlocking member further includes first and second ends slidably coupled with the rod. The first end of the interlocking member is located between the second and third retaining rings, and abuts the second retaining ring. The second end of the interlocking member is disposed between the first and second retaining rings and abuts the connecting member. When the interlocking member moves towards the first retaining ring, the first end of the interlocking member presses against the second retaining ring to move the latch from the latching position to the unlatching position. With the connecting member not pivoted and the anti-pick member in the anti-pick position, when the latch is picked to move from the latching position to the unlatching position, the second retaining ring moves away from the first end of the interlocking member, such that the interlocking member remains unmoved to reliably retain the anti-pick member in the anti-pick position.

In an example, the lock case further comprises a second spring disposed between the second end of the interlocking member and the first retaining ring. The second spring biases the interlocking member. With the anti-pick member in the anti-pick position and the connecting member not pivoted, when the latch is picked to move from the latching position towards the unlatching position, movement of the first retaining ring compresses the first spring, the second spring keeps the second end of the interlocking member to abut against the connecting member without movement, reliably retaining the anti-pick member in the anti-pick position.

The first spring is used to return the latch from the unlatching position to the latching position, and the second spring biases the second end of the interlocking member, such that the latch can move independently relative to the interlocking member or the latch and the interlocking member can move jointly during which the relative position therebetween is maintained. This assures that the anti-pick member can move to the anti-pick position or the non-anti-pick position at the proper timing.

In an example, the lock case further comprises an unlatching rod and a locking operation device. The unlatching rod is pivotably received in the case body. The unlatching rod includes a push portion and a driven portion. The push portion is operatively connected to the interlocking member. The locking operation device is mounted to the case body and including a push block operatively connected to a lock core. When the lock core is unlocked and drives the push block to pivot, the driven portion of the unlatching rod is pressed, and the push portion of the unlatching rod presses against the interlocking member to thereby move the latch from the latching position to the unlatching position.

In an example, the lock case further comprises a third spring. The anti-pick member further includes a second abutting portion spaced from the first abutting portion. The third spring is disposed between the second abutting portion and the case body and biases the anti-pick member towards the anti-pick position.

In an example, the anti-pick member further includes an interlocking end. The anti-pick latch further includes a follower member having a limiting wall. When the anti-pick latch is in the extended position, the limiting wall abuts against the interlocking end to remain the anti-pick member in the anti-pick position, and the first abutting portion is spaced from the push wall. Wen the anti-pick latch is in the retracted position, the limiting wall is spaced from the interlocking end, and the first abutting portion abuts the first wall.

By provision of the limiting wall of the anti-pick latch cooperating with the interlocking end of the anti-pick member, when the door is in the open position, the anti-pick member is reliably retained in the non-anti-pick position, such that the latch can be directly pressed by the door frame to move to the unlatching position without moving the interlocking member. Thus, the door can be closed completely, and the anti-pick member automatically moves to the anti-pick position when the door is in the closed position.

The present invention will become clearer in light of the following detailed description of illustrative embodiments of this invention described in connection with the drawings.

Figure 1:
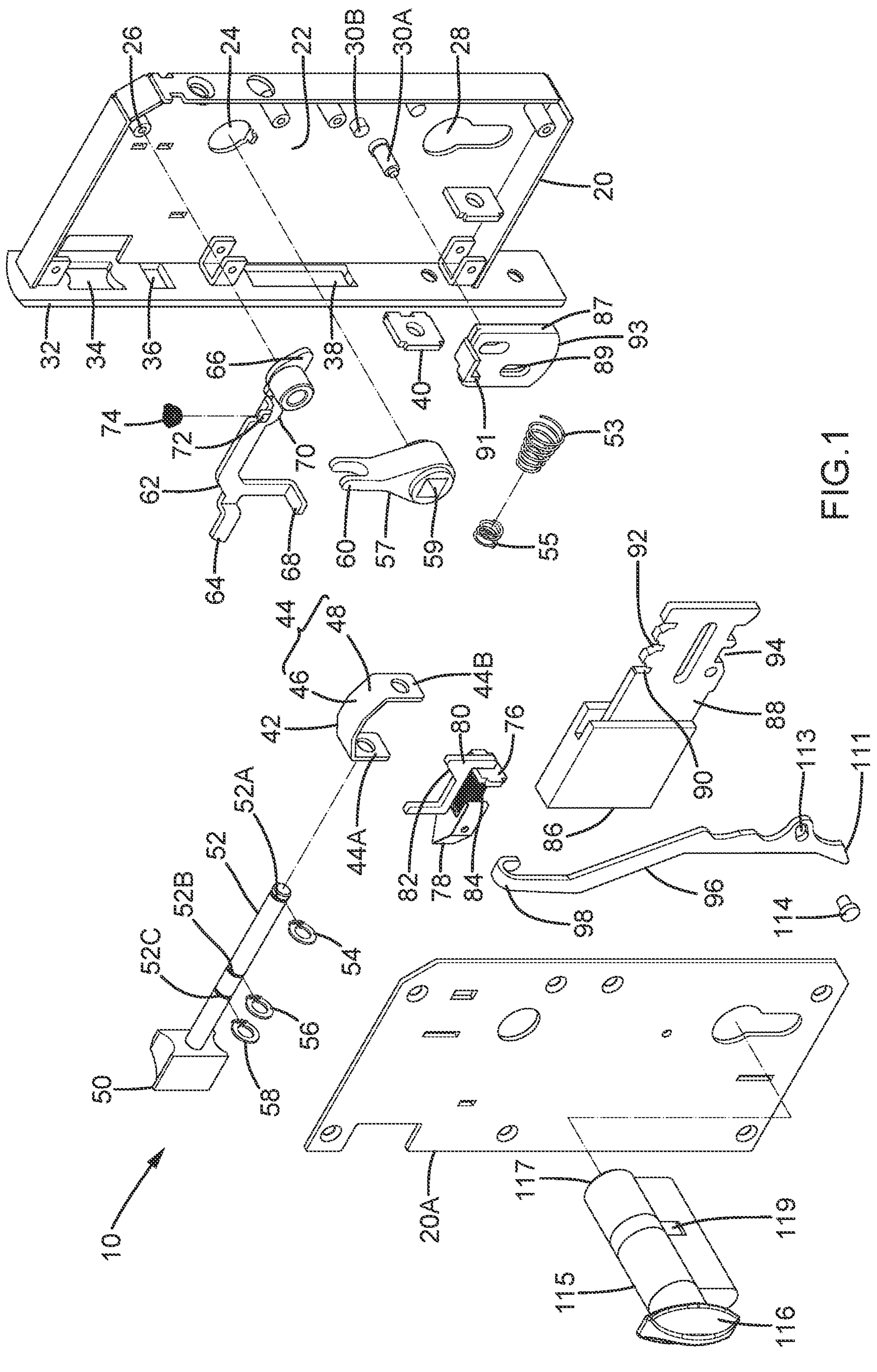
FIG. 1 is an exploded, perspective view of a lock case of an embodiment according to the present invention.

All figures are drawn for ease of explanation of the basic teachings of the present invention only; the extensions of the figures with respect to number, position, relationship, and dimensions of the parts to form the embodiments will be explained or will be within the skill of the art after the following teachings of the present invention have been read and understood. Further, the exact dimensions and dimensional proportions to conform to specific force, weight, strength, and similar requirements will likewise be within the skill of the art after the following teachings of the present invention have been read and understood.

Where used in the various figures of the drawings, the same numerals designate the same or similar parts. Furthermore, when the terms "first", "second", "third", "fourth", "lower", "upper", "inner", "outer", "side", "end", "portion", "axial", "annular", "spacing", "clockwise", "counterclockwise", and similar terms are used herein, it should be understood that these terms have reference only to the structure shown in the drawings as it would appear to a person viewing the drawings and are utilized only to facilitate describing the invention.

DETAILED DESCRIPTION OF THE INVENTION

Figure 2:
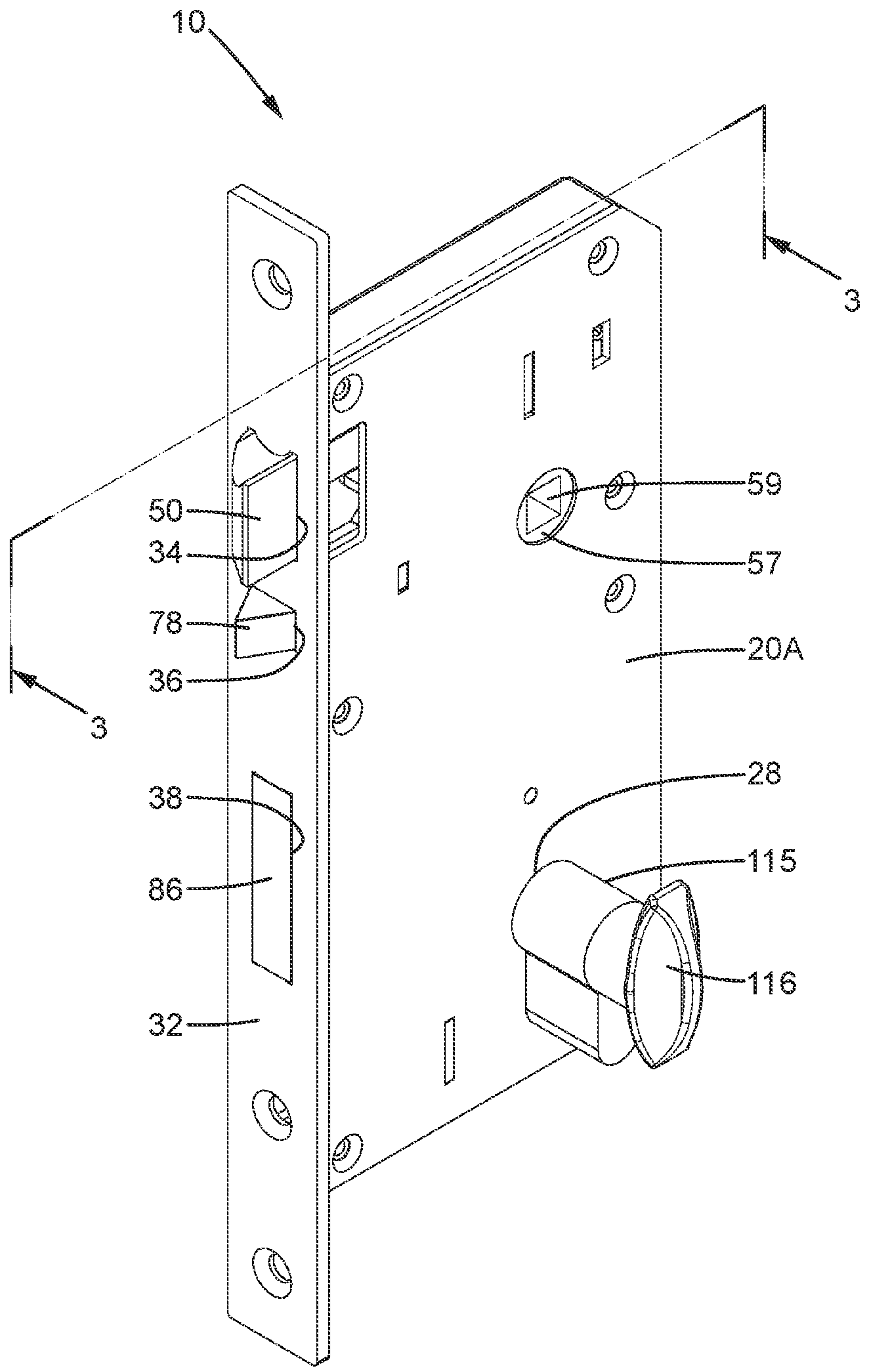
FIG. 2 is a perspective view of the lock case of FIG. 1 after assembly.
Figure 3:
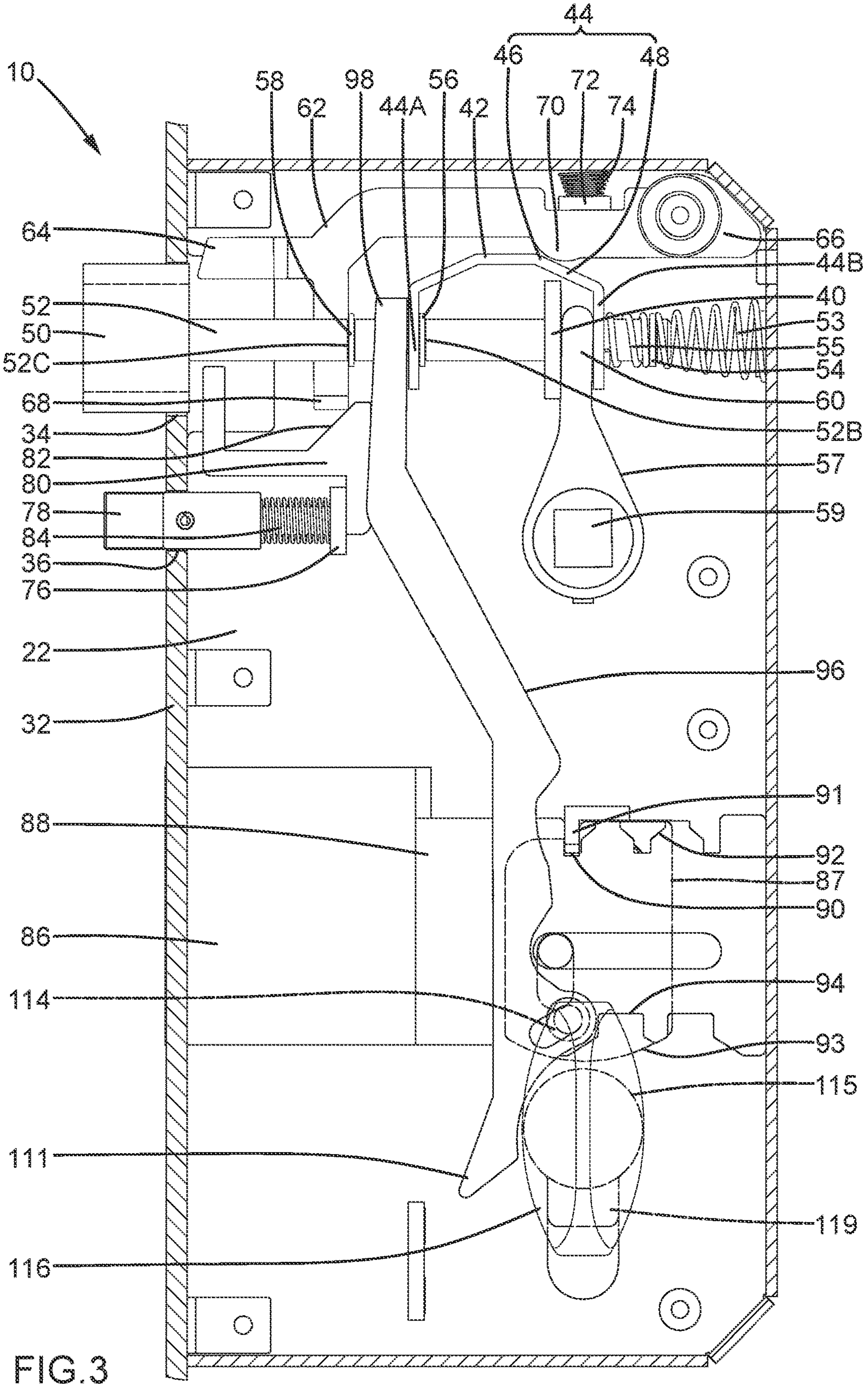
FIG. 3 is a cross sectional view taken along section line 3-3 of FIG. 2.

The present invention relates to a lock case 10 which can be mounted in a door 130 to retain the door 130 in a closed position. With reference to FIGS. 1-3, the lock case 10 includes a case body 20 having a bottom wall 22, an end plate 32 extending perpendicularly to the bottom wall 22, and a lid 20A opposite to the bottom wall 22. First and second pivotal portions 24 and 26 are formed on the bottom wall 22 and spaced from each other. The first pivotal portion 24 can be in the form of a cylindrical hole, and the second pivotal portion 26 can be in the form of a cylinder. A first limiting member 30A, a second limiting member 30B, and a lock core hole 28 are disposed on the bottom wall 22 of the case body 20. Each of the first and second limiting members 30A and 30B can be in the form of a cylinder.

The end plate 32 includes a first hole 34, a second hole 36, and a third hole 38. The second hole 36 is located between the first hole 34 and the third hole 38.

The lock case 10 further includes a latch 50 slidably mounted to the case body 20 and a first supporting member 40. The latch 50 includes a rod 52 extending from an end face thereof. A first engaging groove 52A, a second engaging groove 52B, and a third engaging groove 52C are formed on an outer periphery of the rod 52 and can be in the form of annular grooves.

Figure 9:
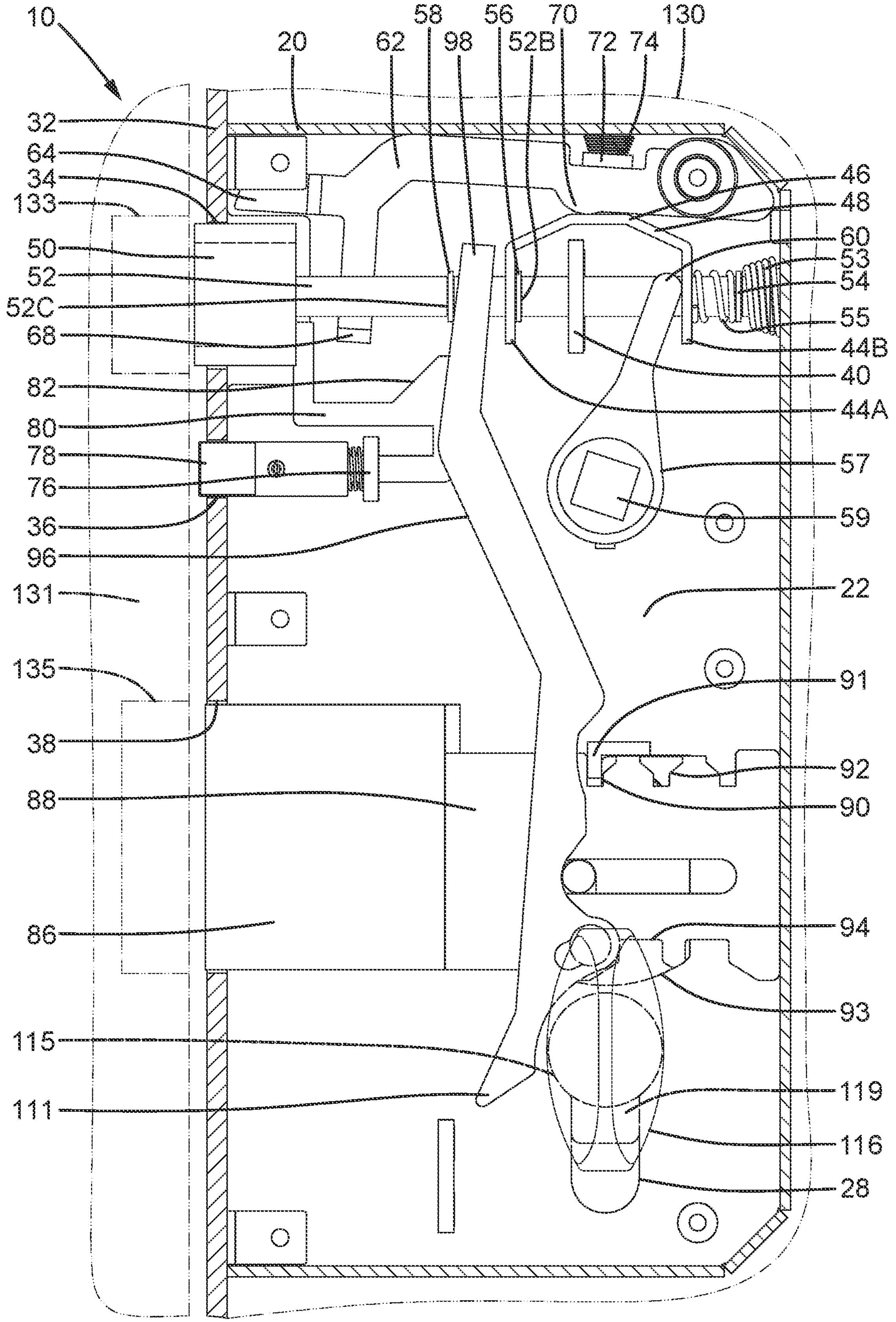
FIG. 9 is a cross sectional view of the lock case with the latch moved to an unlatching position.
Figure 10:
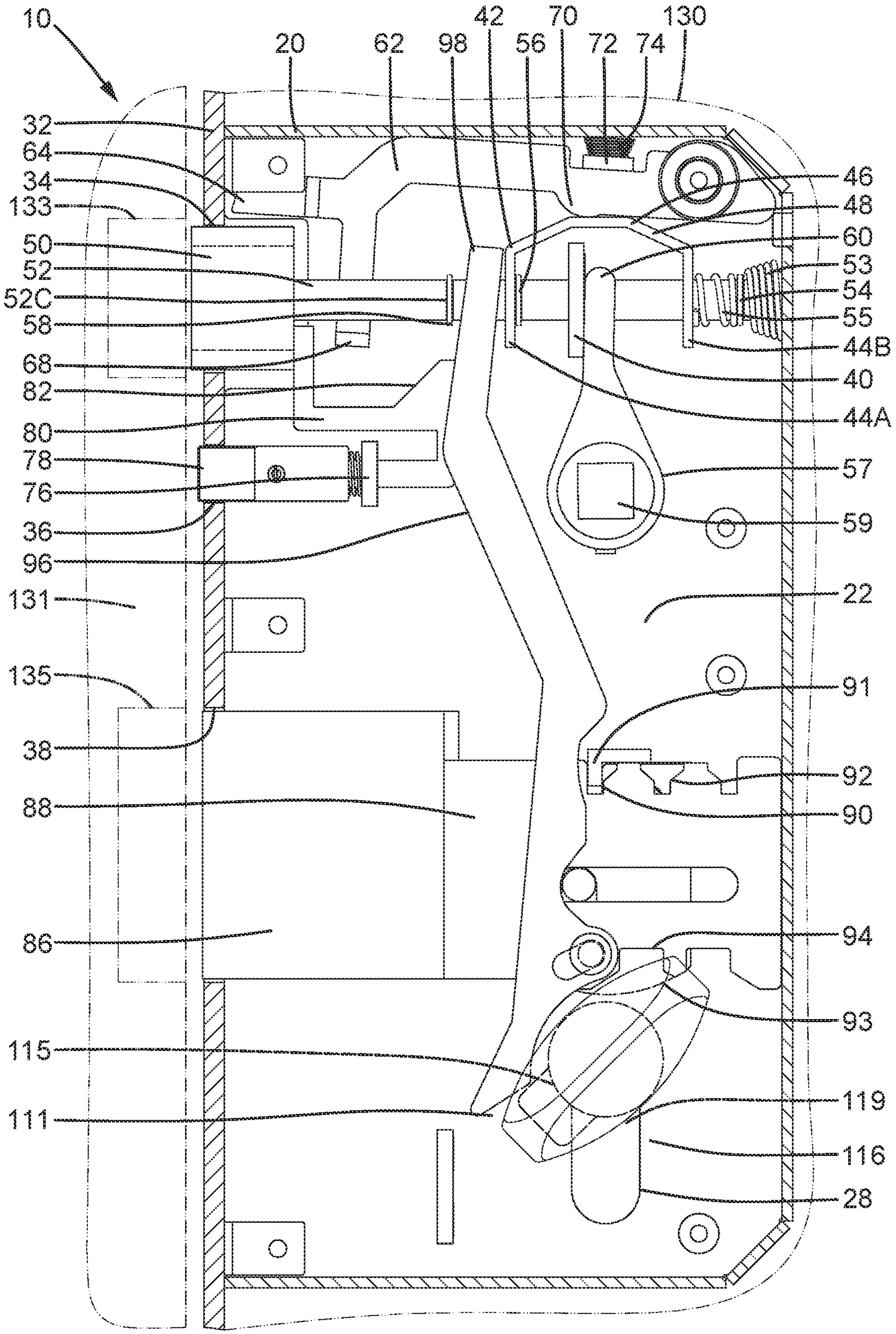
FIG. 10 is a cross sectional view of the lock case with an unlatching rod pushed by a locking operation device to move the latch to the unlatching position.

The first supporting member 40 is substantially in the form of a piece with a hole. The first supporting member 40 is securely mounted on the bottom wall 22 of the case body 20. The rod 52 of the latch 50 slidably extends through the first supporting member 40 and the first hole 34, such that the latch 50 is movable in an axial direction of the rod 52 between a latching position (FIG. 3) and an unlatching position (FIGS. 9 and 10). The extent of the latch 50 in the latching position protruding beyond the end plate 32 is greater than that of the latch 50 in the unlatching position protruding beyond the end plate 32.

A first retaining ring 54 is disposed in the first engaging groove 52A. A second retaining ring 56 is disposed in the second engaging groove 52B. A third retaining ring 58 is disposed in the third engaging groove 52C. The first supporting member 40 is substantially located between the first and second retaining rings 54 and 56.

The lock case 10 further includes an interlocking member 42 jointly movable with the latch 50 and a connecting member 57 pivotably connected to the case body 20. The interlocking member 42 includes a push wall 44 having an upper end 46 and a lower end 48 that is inclined relative to the upper end 46. The interlocking member 42 further includes a first end 44A and a second end 44B spaced from the first end 44A in the axial direction of the rod 52. The second end 44B is connected to the lower end 48.

The rod 52 of the latch 50 slidably extends through the first and second ends 44A and 44B of the interlocking member 42. The first end 44A is located between the second and third retaining rings 56 and 58 and abuts the second retaining ring 56. The second end 44B is located between and spaced from the first and second retaining rings 54 and 56.

A first spring 53 and a second spring 55 are disposed between the latch 50 and the case body 20. The first spring 53 is disposed between the first retaining ring 54 and the case body 20 and biases the latch 50 towards the latching position through the first retaining ring 54. The second spring 55 is disposed between the second end 44B of the interlocking member 42 and the first retaining ring 54 and biases the interlocking member 42 towards the latching position.

The connecting member 57 includes a connecting hole 59 coaxial with the rotating axis of the connecting member 57. The connecting member 57 further includes a push end 6) eccentric to the connecting hole 59. The connecting member 57 is pivotably connected to the first pivotal portion 24 of the case body 20. The push end 60 is located between the second end 44B of the interlocking member 42 and the first supporting member 40. Since the second end 44B of the interlocking member 42 is biased by the second spring 55, the connecting member 57 is biased, such that the push end 60 abuts both the first supporting member 40 and the second end 44B of the interlocking member 42, as shown in FIG. 3.

The lock case 10 further includes an anti-pick member 62 pivotably connected to the case body 20. The anti-pick member 62 includes an abutting end 64 and a pivotal end 66 spaced from the abutting end 64 in a direction parallel to the axial direction of the rod 52. The anti-pick member 62 further includes first and second abutting portions 70 and 72 between the abutting end 64 and the pivotal end 66. The anti-pick member 62 further includes an interlocking end 68 between the abutting end 64 and the first abutting portion 70. The pivotal end 66 of the anti-pick member 62 is pivotably connected to the second pivotal portion 26 of the case body 20. The first abutting portion 70 faces the push wall 44 of the interlocking member 42, and the abutting end 64 faces the latch 50. The anti-pick member 62 is pivotable about a pivoting axis defined by the second pivotal portion 26 between an anti-pick position (FIG. 4) and a non-anti-pick position (FIG. 3). A third spring 74 is disposed between the second abutting portion 72 of the anti-pick member 62 and the case body 20 and biases the anti-pick member 62 towards the anti-pick position.

Figure 4:
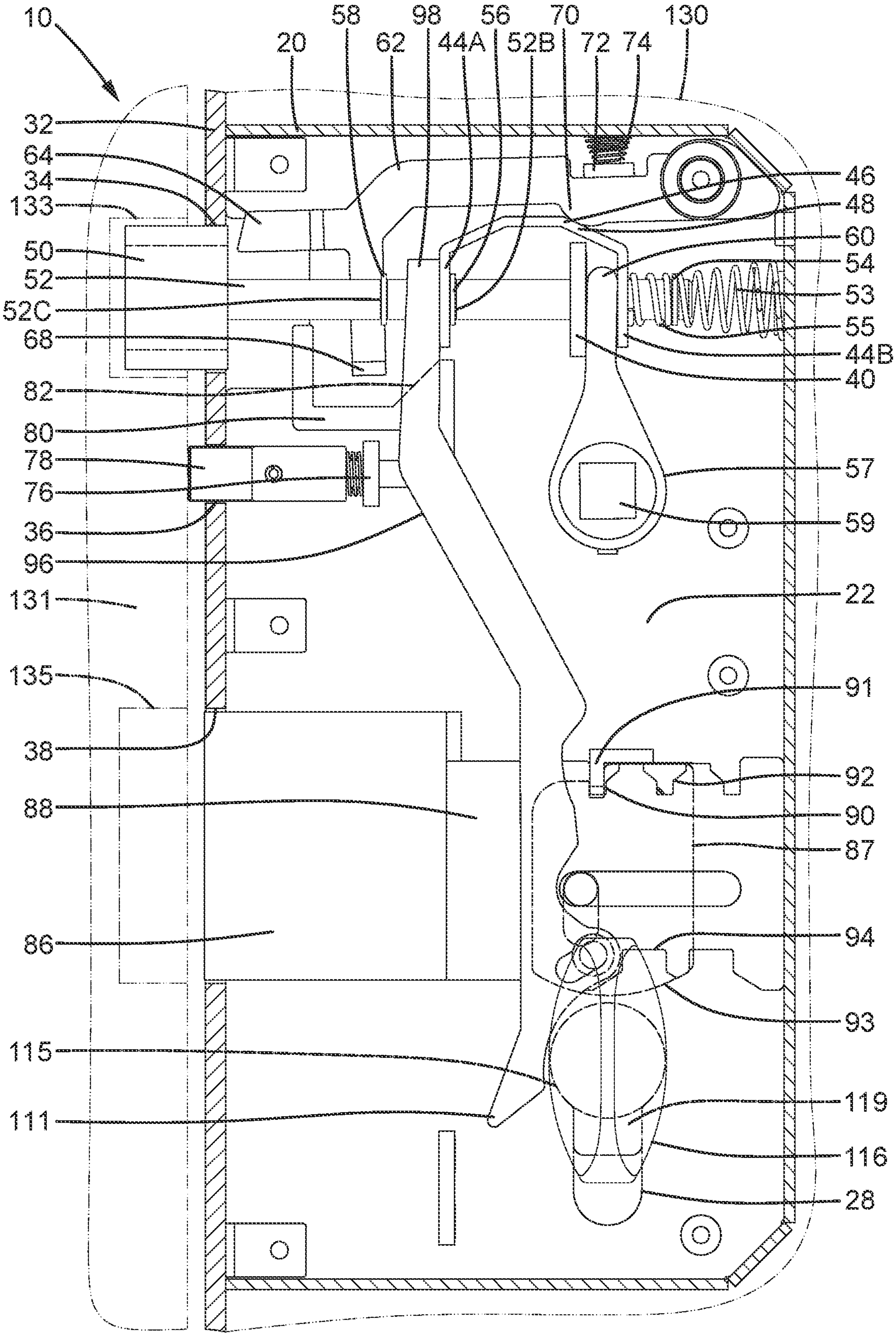
FIG. 4 is a cross sectional view of the lock case mounted in a door in a closed position.

The lock case 10 further includes an anti-pick latch 78 slidably coupled to the case body 20 and a second supporting member 76. The second supporting member 76 can be in the form of a piece fixed on the bottom wall 22 of the case body 20. The anti-pick latch 78 includes a follower member 80 slidably coupled to the second supporting member 76 and is slidably couple with the second hole 36. Thus, the anti-pick latch 78 is movable between an extended position (FIG. 3) and a retracted position (FIG. 4). An extent of the anti-pick latch 78 in the extended position protruding beyond the end plate 32 is greater than that of the anti-pick latch 78 in the retracted position protruding beyond the end plate 32. A fourth spring 84 is disposed between the anti-pick latch 78 and the second supporting member 76 and biases the anti-pick latch 78 towards the extended position.

The lock case 10 further includes a slidable locking block 87 and an anti-theft latch 86, which are slidably coupled to the case body 20. The slidable locking block 87 includes two sliding grooves 89 and a bottom end 93 below the two sliding grooves 89. The slidable locking block 87 further includes an engaging portion 91 spaced from the bottom end 93. The first and second limiting members 30A and 30B are slidably received in the two sliding grooves 89, assuring that the slidable locking block 87 can move rectilinearly relative to the case body 20.

The anti-theft latch 86 includes an extension portion 88. A recession 90 and a latching groove 92 are formed on an upper side of the extension portion 88. An actuating groove 84 is formed on a lower side of the extension portion 88. The anti-theft latch 86 is slidably received in the case body 20 and is slidably coupled with the first limiting member 30A and the third hole 38. The anti-theft latch 86 is movable between an anti-theft position (FIG. 7) and a non-anti-theft position (FIG. 3). The slidable locking block 87 is located between the bottom wall 22 of the case body 20 and the extension portion 88 of the anti-theft latch 86. The engaging portion 91 of the slidable locking block 87 is disengageably coupled with the recession 90 or the latching groove 92.

The lock case 10 further includes an unlatching rod 96 pivotably received in the case body 20. The unlatching rod 96 includes a push portion 98 and a driven portion 111. The unlatching rod 96 further includes a coupling portion 113 between the push portion 98 and the driven portion 111. The push portion 98 is substantially U-shaped.

The coupling portion 113 of the unlatching rod 96 is pivotably coupled with a pin 114. The pin 114 is coupled with the extension portion 88 of the anti-theft latch 86 to move therewith. The push portion 98 of the unlatching rod 96 is slidably coupled with the rod 52 of the latch 50. The push portion 98 is located between the first end 44A of the interlocking member 42 and the third retaining ring 58. Thus, pivotal movement of the unlatching rod 96 causes movement of the interlocking member 42.

The lock case 10 further includes a locking operation device 115 having a pivotable push block 119. The locking operation device 115 further includes a knob 116 interlocked with the push block 119 and a lock core 117 received therein. The knob 116 can be actuated to drive the push block 119 to pivot. The push block 119 can be pivoted only after a key is used to unlock the lock core 117.

The locking operation device 115 is coupled with the lock core hole 28 of the case body 20. The knob 116 is located on an indoor side. The lock core 117 is located on an outdoor side. The push block 119 is aligned with the lower end 93 of the slidable locking block 87, the extension portion 88 of the anti-theft latch 86, and the driven portion 111 of the unlatching rod 96 in the axial direction of the lock core hole 28.

The lock case 10 is mounted to an inner side of the door 130 pivotably mounted in a door frame 131, permitting the door 130 to pivot relative to the frame 131 to an open position and the closed position. Although not specifically shown, the lock case 10 according to the present invention may be used together with currently available inner and outer operating devices which are operatively coupled with the connecting member 57. Furthermore, the outer operating device permits setting of an anti-theft function, such that the outer operating device cannot operate the lock case 10 via the connecting member 57.

Now that the basic construction of the lock case 10 of the present invention has been explained, the operation and some of the advantages of the lock case 10 can be set forth and appreciated. In particular, for the sake of explanation, it will be assumed that the door 130 is not closed (see FIG. 3), and the latch 50 is in the latching position, and the anti-pick latch 78 is in the extended position. Thus, the limiting wall 82 of the follower member 80 abuts the interlocking end 68 of the anti-pick member 62. As a result, the anti-pick member 62 is retained in the non-anti-pick position, and the first abutting portion 70 is spaced from the push wall 44 of the interlocking member 42. Furthermore, the anti-theft latch 86 is in the non-anti-theft position, and the engaging portion 91 of the slidable locking block 87 is coupled with the recession 90 of the extension portion 88 of the anti-theft latch 86. Thus, the anti-theft latch 86 is retained in the non-anti-theft position.

When the latch 50 is directly pressed to move towards the unlatching position while the door 130 is open and the anti-pick member 62 is in the non-anti-pick position, the latch 50 can move from the latching position to the unlatching position. Thus, when the door 130 pivots towards the closed position, the latch 50 is pressed by the door frame 131 and moves to the unlatching position without moving the interlocking member 42. When the door 130 is completely closed, the latch 50 is aligned with a latch hole 133 in the door frame 131, and the first spring 53 returns the latch 50 to the latching position to engage with the latch hole 133 in the door frame 131, thereby retaining the door 130 in the closed position.

With reference to FIG. 4, with the door 130 in the closed state, the anti-pick latch 78 is pressed by the frame 131 to move from the extended position to the retracted position, such that the limiting wall 82 of the follower member 80 disengages from the interlocking end 68 of the anti-pick member 62. As a result, the anti-pick member 62 is biased by the third spring 74 to pivot from the non-anti-pick position to the anti-pick position. In this state, the first abutting portion 70 abuts against the lower end 48 of the push wall 44 of the interlocking member 42. Furthermore, the abutting end 64 of the anti-pick member 62 is on a path interfering with movement of the latch 50 from the unlatching position to the latching position.

Figure 5:
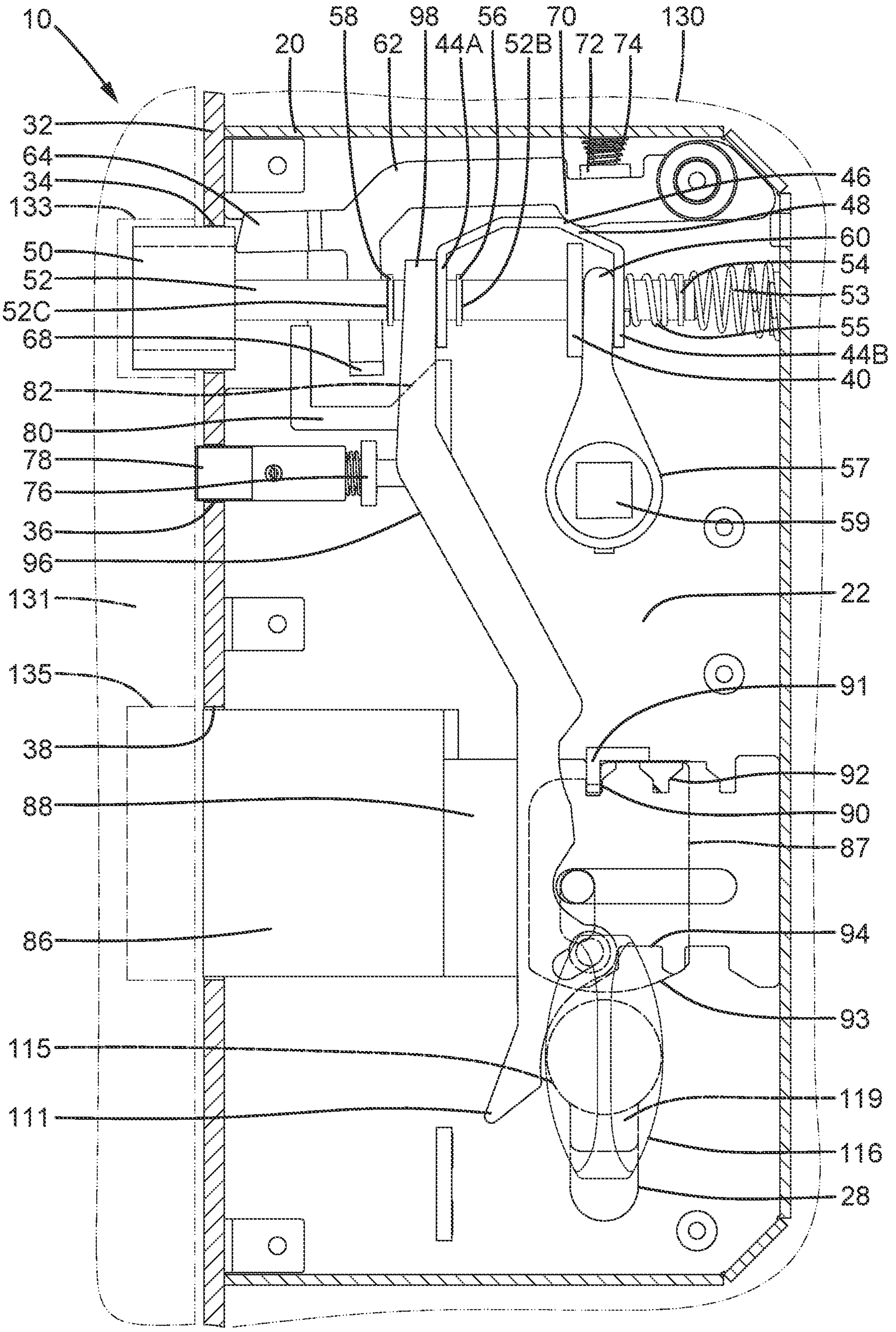
FIG. 5 is a cross sectional view of the lock case illustrating an anti-picking mechanism when a latch is picked.

In this state, when the outer operating device is set to a locking status, the outer operating device cannot be used to interlock with the lock case 10. In a case that a thief intends to pick the latch 50 via a gap between the door 130 and the door frame 131, since the interlocking member 42 can move relative to the latch 50, movement of the latch 50 cannot actuate the interlocking member 42, such that the anti-pick member 62 retains in the anti-pick position. With reference to FIG. 5, when the latch 50 moves along the path towards the unlatching position to a position abutting the abutting end 64 of the anti-pick member 62, the latch 50 cannot move further to the unlatching position, and the latch 50 still engages with the latch hole 131 of the door frame 131, avoiding unauthorized opening of the door 130.

Figure 6:
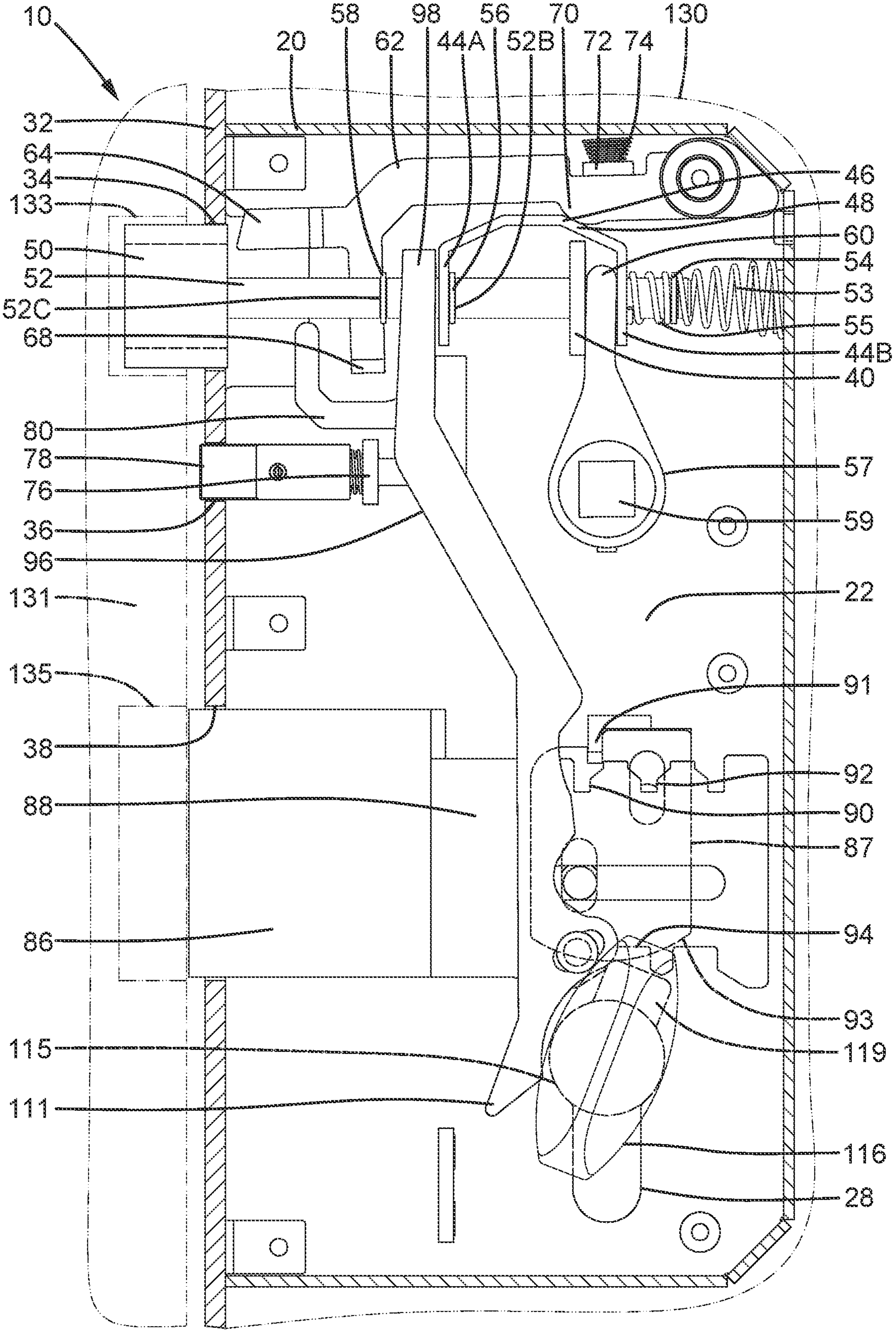
FIG. 6 is a cross sectional view illustrating disengagement of an engaging portion of a slidable locking block from a recession.

The anti-theft effect of the door 130 can be enhanced by moving the anti-theft latch 86 to the anti-theft position. Specifically, the knob 116 or the lock core 117 (which must be operated by a key) can be pivoted to move the push block 119 in the counterclockwise direction. With reference to FIG. 6, during the counterclockwise movement, the push block 119 firstly abuts against the bottom end 93 of the slidable locking block 87. Movement of the slidable locking block 87 causes disengagement of the engaging portion 91 from the recession 90. In this state, the anti-theft latch 86 can displace. Further counterclockwise movement of the push block 119 presses against the actuating groove 94 of the extension portion 88, thereby pushing the anti-theft latch 86 from the non-anti-theft position to the anti-theft position.

Figure 7:
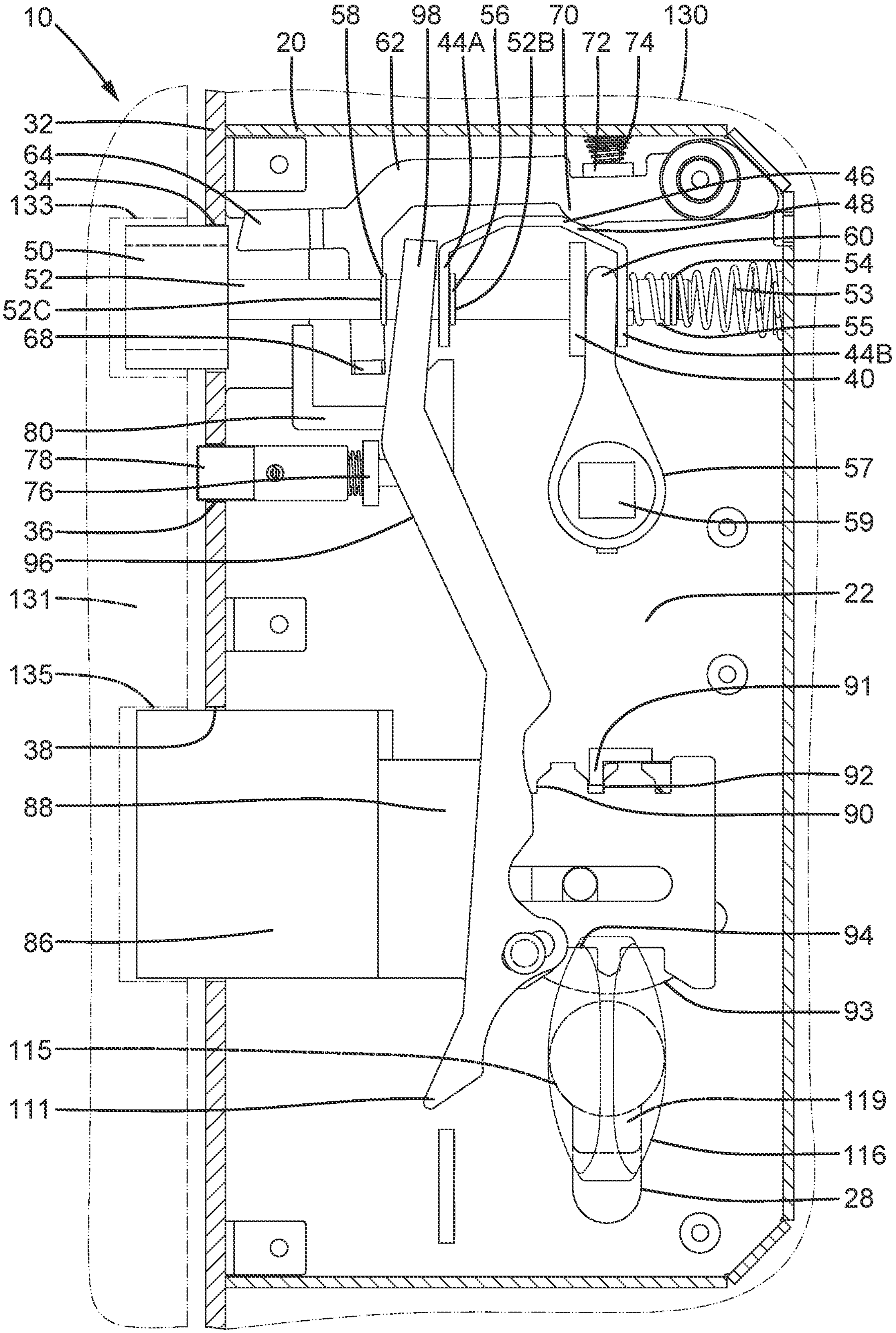
FIG. 7 is a cross sectional view of the lock case with an anti-theft latch moved to an anti-theft position.

With reference to FIG. 7, when the anti-theft latch 86 is in the anti-theft position, the distal end of the anti-theft latch 86 engages with an anti-theft latch hole 135 of the door frame 131. In this state, even though the latch 50 is in the unlatching position, the door 130 still cannot be opened. Furthermore, with the anti-theft latch 86 in the anti-theft position, the push block 119 is moved clockwise to its original position, and the slidable locking block 87 returns to its original position under the action of the gravitational force. Thus, the engaging portion 91 engages with the latching groove 92 of the anti-theft latch 86, thereby retaining the anti-theft latch 86 in the anti-theft position.

With reference to FIGS. 4 and 7, the spacing between the driven portion **11*l* of the unlatching rod 96 and the push block 119 while the anti-theft latch 86 is in the non-anti-theft position is smaller than the spacing between the driven portion 111 of the unlatching rod 96 and the push block 119 while the anti-theft latch 86 is in the anti-theft position. Specifically, as shown in FIG. 4, when the anti-theft latch 86 is in the non-anti-theft position, the driven portion 111 of the unlatching rod 96 is on a rotational path of the push block 119, such that counterclockwise movement of the push block 119 cannot press against the driven portion 111, but clockwise movement of the push block 119 can press against the driven portion 111. As shown in FIG. 7, when the anti-theft latch 86 is in the anti-theft position, the driven portion 111 of the unlatching rod 96 is outside of the rotational path of the push block 119, such that none of the clockwise movement and the counterclockwise movement of the push block 119 can press against the driven portion 111 of the unlatching rod 96**.

When it is desired to move the anti-theft latch 86 from the anti-theft position to the non-anti-theft position, the knob 116 or the lock core 117 is moved to rotate the push block 119 in the clockwise direction without pressing against the driven portion 111 of the unlatching rod 96. Firstly, the engaging portion 91 disengages from the latching groove 92. Then, the push block 119 pushes the anti-theft latch 86 to move from the anti-theft position (FIG. 7) to the non-anti-theft position (FIG. 4), thereby disengaging the anti-theft latch 86 from the anti-theft latch hole 135.

Figure 8:
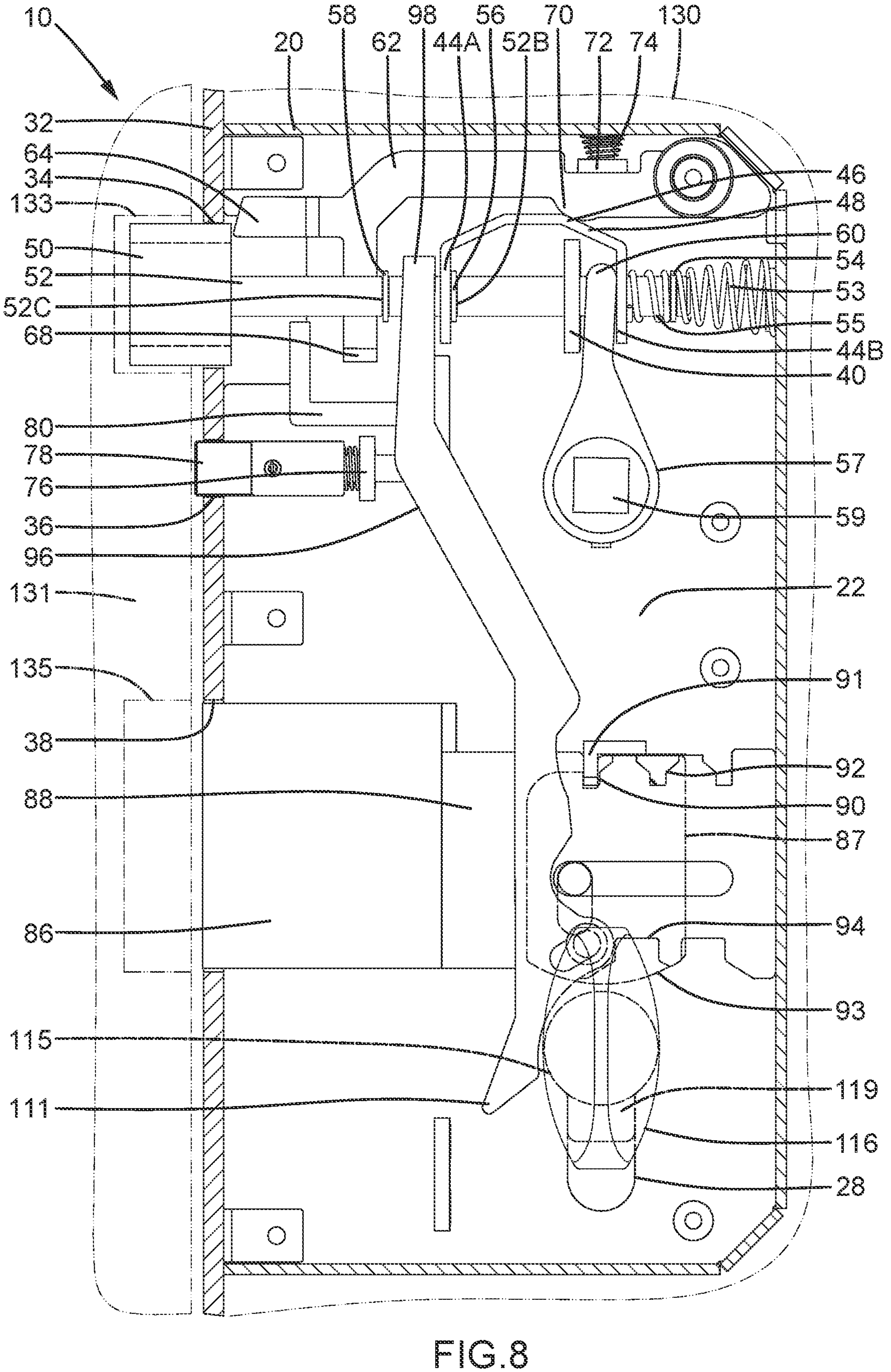
FIG. 8 is a cross sectional view of the lock case with a connecting member pushed by an inner operating device or an outer operating device to jointly move a follower member and the latch and with an anti-pick member moved to a non-anti-pick position.

With reference to FIGS. 4 and 8, with the door 130 closed and the anti-theft latch 86 in the non-anti-theft position, when it is desired to open the door 130 while the outer operating device is unlocked, the outer operating device or the inner operating device can be operated to drive the connecting member 57 to pivot in the clockwise direction. The push end 60 of the connecting member 57 presses against the second end 44B of the interlocking member 44, and the first end 44A of the interlocking member 42 presses against the second retaining ring 56. Thus, the interlocking member 42 and the latch 50 move jointly from the latching position (FIG. 4) to the unlatching position (FIG. 8).

At the first moment of the joint movement of the latch 50 and the interlocking member 42 towards the unlatching position, although the anti-pick member 62 is in the anti-pick position, movement of the interlocking member 42 causes the lower end 48 of the push wall 44 to press against the first abutting portion 70 of the anti-pick member 62, such that the anti-pick member 62 is in the non-anti-pick position when the upper end 46 of the interlocking member 42 moves to a position in alignment with the first abutting portion 70. At this moment, the latch 50 does not press against the abutting end 64 of the anti-pick member 62. Furthermore, clockwise movement of the connecting member 57 actuates the latch 50 and the interlocking member 42 to move jointly to the unlatching position. As shown in FIG. 9, when the latch 50 is in the unlatching position, the latch 50 disengages from the latch hole 133, permitting opening of the door 130.

The first spring 53 is compressed when the latch 50 moves to the unlatching position. When the connecting member 57 is released, the first spring 53 biases the first retaining ring 54 to move the latch 50 from the unlatching position to the unlatching position. The first retaining ring 54 presses against the second spring 55 which biases the second end 44B of the interlocking member 42 to thereby jointly move the interlocking member 42 and the latch 50 from the latching position to the unlatching position.

Apart from using the inner and outer operating devices to actuate the connecting member 57 for moving the latch 50 to the unlatching position, the locking operation device 115 of the lock case 10 can be used to cooperate with the unlatching rod 96 for moving the latch 50 to the unlatching position. With reference to FIG. 10, specifically, when the push block 119 pivots in the clockwise direction while the anti-theft latch 86 is in the non-anti-theft position, the push block 119 presses against the driven portion 111 of the unlatching rod 96, causing pivotal movement of the unlatching rod 96 about the pivotal axis defined by the pin 114. The push portion 98 of the unlatching rod 96 presses against the first end 44A of the interlocking member 42, causing joint movement of the interlocking member 42 and the latch 50 towards the unlatching position. The anti-pick member 62 is also pressed by the push wall 44 to move from the anti-pick position to the non-anti-pick position, such that the door 130 can be opened when the latch 50 reaches the unlatching position.

According to the present invention, by provision of the anti-pick latch 78 cooperating with the interlocking member 42 and the anti-pick member 62, when the door 130 is closed, the anti-pick member 62 automatically moves to the anti-pick position. When the latch 50 is picked (with the intention to move the latch 50 to the unlatching position), the interlocking member 42 remains unmoved, such that the anti-pick member 62 remains in the anti-pick position. Thus, the latch 50 cannot move to the unlatching position, and the door 130 cannot be opened.

By provision of the push wall 44 of the interlocking member 42, when the interlocking member 42 and the latch 50 move jointly towards the unlatching position, the anti-pick member 62 is pressed by the push wall 44 of the interlocking member 42 to pivot to the non-anti-pick position before the latch 50 presses against the abutting end 64 of the anti-pick member 62. Thus, the latch 50 can be moved to the unlatching position by the connecting member 57 and the unlatching rod 96 which pushes the interlocking member 42.

The first spring 53 is used to return the latch 50 from the unlatching position to the latching position, and the second spring 55 biases the second end 44B of the interlocking member 42, such that the latch 50 can move independently relative to the interlocking member 42 or the latch 50 and the interlocking member 42 can move jointly during which the relative position therebetween is maintained. This assures that the anti-pick member 62 can move to the anti-pick position or the non-anti-pick position at the proper timing.

By provision of the limiting wall 82 of the anti-pick latch 78 cooperating with the interlocking end 68 of the anti-pick member 62, when the door 130 is in the open position, the anti-pick member 62 is reliably retained in the non-anti-pick position, such that the latch 50 can be directly pressed by the door frame 131 to move to the unlatching position without moving the interlocking member 42. Thus, the door 130 can be closed completely, and the anti-pick member 62 automatically moves to the anti-pick position when the door 130 is in the closed position.

Now that the basic teachings of the present invention have been explained, many extensions and variations will be obvious to one having ordinary skill in the art. For example, the lock case 10 does not have to include the anti-theft latch 86 and the unlatching rod 96 without adversely affecting the anti-theft function of the latch 50.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

The invention claimed is:

1. A lock case comprising:

a case body;

a latch movably coupled to the lock case and movable between a latching position and an unlatching position;

an interlocking member operatively coupled with the latch and including a push wall, wherein the push wall includes an upper end and a lower end;

an anti-pick member pivotably mounted to the case body and including a first abutting portion, wherein the anti-pick member is pivotable between an anti-pick position and a non-anti-pick position;

an anti-pick latch movably coupled to the case body and operatively connected to the anti-pick member, wherein the anti-pick latch is movable between an extended position and a retracted position, wherein when the anti-pick latch is in the extended position, the first abutting portion is spaced from the push wall of the interlocking member, and the anti-pick member remains in the non-anti-pick position, and wherein when the anti-pick latch is in the retracted position, the first abutting portion abuts against the push wall, and the anti-pick member is pivotable to the anti-pick position or the non-anti-pick position; and a connecting member pivotably connected to the case body and operatively connected to the interlocking member, wherein pivotal movement of the connecting member actuates the interlocking member and the latch to move jointly between the latching position and the unlatching position, wherein when the latch is in the latching position and the anti-pick latch is in the retracted position, the anti-pick member is in the anti-pick position and the first abutting portion abuts the lower end of the push wall, wherein when the latch is in the latching position and the anti-pick latch is in the retracted position, the anti-pick member is in the non-anti-pick position and the first abutting portion abuts the upper end of the push wall, and wherein with the anti-pick member in the anti-pick position and the connecting member not pivoted, the interlocking member remains unmoved when the latch is picked to move from the latching position towards the unlatching position, such that the anti-pick member remains in the anti-pick position, preventing the latch from moving from the latching position to the unlatching position.

2. The lock case as claimed in claim 1, further comprising a first spring, wherein the latch includes a rod extending therefrom, wherein first, second, and third retaining rings are disposed on the rod, wherein the second retaining ring is disposed between the first retaining ring and the third retaining ring, wherein the first spring is disposed between the first retaining ring and the case body and biases the latch to the latching position, wherein the interlocking member further includes first and second ends slidably coupled with the rod, wherein the first end of the interlocking member is located between the second and third retaining rings, and abuts the second retaining ring, wherein the second end of the interlocking member is disposed between the first and second retaining rings and abuts the connecting member, wherein when the interlocking member moves towards the first retaining ring, the first end of the interlocking member presses against the second retaining ring to move the latch from the latching position to the unlatching position, and wherein with the connecting member not pivoted and the anti-pick member in the anti-pick position, when the latch is picked to move from the latching position to the unlatching position, the second retaining ring moves away from the first end of the interlocking member, such that the interlocking member remains unmoved to reliably retain the anti-pick member in the anti-pick position.

3. The lock case as claimed in claim 2, further comprising a second spring disposed between the second end of the interlocking member and the first retaining ring, wherein the second spring biases the interlocking member, and wherein with the anti-pick member in the anti-pick position and the connecting member not pivoted, when the latch is picked to move from the latching position towards the unlatching position, movement of the first retaining ring compresses the first spring, the second spring keeps the second end of the interlocking member to abut against the connecting member without movement, reliably retaining the anti-pick member in the anti-pick position.

4. The lock case as claimed in claim 1, further comprising:

an unlatching rod pivotably received in the case body, wherein the unlatching rod includes a push portion and a driven portion, and wherein the push portion is operatively connected to the interlocking member; and a locking operation device mounted to the case body and including a push block operatively connected to a lock core, wherein when the lock core is unlocked and drives the push block to pivot, the driven portion of the unlatching rod is pressed, and the push portion of the unlatching rod presses against the interlocking member to thereby move the latch from the latching position to the unlatching position.

5. The lock case as claimed in claim 1, further comprising a third spring, wherein the anti-pick member further includes a second abutting portion spaced from the first abutting portion, and wherein the third spring is disposed between the second abutting portion and the case body and biases the anti-pick member towards the anti-pick position.

6. The lock case as claimed in claim 1, wherein the anti-pick member further includes an interlocking end, wherein the anti-pick latch further includes a follower member having a limiting wall, wherein when the anti-pick latch is in the extended position, the limiting wall abuts against the interlocking end to remain the anti-pick member in the anti-pick position, and the first abutting portion is spaced from the push wall, and wherein when the anti-pick latch is in the retracted position, the limiting wall is spaced from the interlocking end, and the first abutting portion abuts the first wall.

* * * * *